US006238071B1

(12) United States Patent
Fratty

(10) Patent No.: US 6,238,071 B1
(45) **Date of Patent: *May 29, 2001**

(54) MOTOR VEHICLE HEADLIGHT HAVING A SINGLE LIGHT SOURCE AND ADAPTED TO PRODUCE A DIPPED BEAM AND A MAIN BEAM

(75) Inventor: Hector Fratty, Boulogne (FR)

(73) Assignee: Valeo Vision, Bobigny (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/802,074

(22) Filed: Feb. 19, 1997

(30) Foreign Application Priority Data

Feb. 20, 1996 (FR) .................................................. 96 02061

(51) Int. Cl.[7] ...................................................... B60Q 1/06

(52) U.S. Cl. .......................... 362/514; 362/530; 362/532; 362/465; 362/467

(58) Field of Search .................................... 362/512, 514, 362/515, 419, 423, 530, 531, 532, 523, 465, 466, 467, 468, 529, 524, 526

(56) References Cited

U.S. PATENT DOCUMENTS 4,574,334 * 3/1986 Igura .................................... 362/515
4,739,223 * 4/1988 Baba et al. ........................... 362/514
4,916,587 * 4/1990 Hirose et al. ........................ 362/526
4,954,933 * 9/1990 Wassen ................................ 362/514
5,003,436 * 3/1991 Yamada et al. ....................... 362/515
5,381,313 * 1/1995 Choji .................................... 362/530
5,390,088 2/1995 Tsukada .
5,599,085 * 2/1997 Tabata et al. ........................ 362/467
5,673,993 * 10/1997 Fukui .................................. 362/515

FOREIGN PATENT DOCUMENTS 37 22 581 1/1988 (DE) .
44 18 733 11/1995 (DE) .
1 461 607 12/1966 (FR) .
2 009 672 1/1970 (FR) .
2 192 449 1/1988 (GB) .

OTHER PUBLICATIONS

French Search Report dated Nov. 15, 1996.

* cited by examiner

*Primary Examiner*—Thomas M. Sember
(74) *Attorney, Agent, or Firm*—Morgan & Finnegan, LLP

(57) ABSTRACT

A motor vehicle headlight has a single light source and a single reflector which receives the light from the source, and which is tripod mounted on three bearing points defining the three apices of a triangle. The headlight has controlled displacement means for selectively displacing at least one of these bearing points in straight line movement.

The controlled displacement means comprise a single beam switching device for displacing one of the three bearing points into one of only two discrete positions, namely a first position corresponding to a dipped beam and a second position, higher than the first position, corresponding to a main beam.

19 Claims, 2 Drawing Sheets

MOTOR VEHICLE HEADLIGHT HAVING A SINGLE LIGHT SOURCE AND ADAPTED TO PRODUCE A DIPPED BEAM AND A MAIN BEAM

FIELD OF THE INVENTION

The present invention relates in general terms to motor vehicle headlights. More particularly, the invention is directed to headlights having a single light source, such as a lamp or light bulb, the headlight being adapted to produce, selectively, a dipped beam and a main beam.

BACKGROUND OF THE INVENTION

It is already known, in particular from French patent specification No. FR 1 461 607 A, to provide a headlight which has a single light source, in this case a monofilament lamp, which co-operates with a reflector which is adapted to tilt about a horizontal axis at right angles to its optical axis. In its downwardly tilted position, the dipped beam, i.e. the beam which is intended to prevent dazzling of the occupants of oncoming vehicles, is formed. The reflector is raised in order to obtain a main beam, or cruising beam, of longer range.

This particular known type of headlight is of a construction which is completely unsuitable for modern headlights, and in particular those which further include means for correcting the orientation of the beam both in elevation and azimuth, these correcting means being either manual or automatic.

It is also known, from German patent specification DE 4 418 733 A, to provide a headlight which is adapted to produce from a single light source (such as a filament or an arc), together with a single reflector, both of these two types of beam. In this connection, the reflector has a fixed portion and one or more moveable portions. The displacement of the moveable portions, by means of appropriate actuators, effects the change from one type of beam to the other.

However, this approach is disadvantageous, in that it greatly complicates the design and manufacture of the reflector, and in some cases it gives rise to losses of light, or optical faults, especially at the interfaces between the fixed and moveable portions of the reflector.

United Kingdom patent specification No. GB 2 192 449 A discloses a headlight in which the operation of changing from the dipped beam mode to the main beam mode is effected by tilting the reflector by means of two devices, each of which acts on one respecting bearing point, or support point, of the reflector. However, that particular arrangement is expensive, because it makes use of two control devices for changing the beam from the dipped mode to the main beam mode. In addition, these two control devices are entirely dedicated to the change from dipped to main beam, and no other device for correcting the orientation of the beam (for example any dynamic correction device) is provided in that headlight.

DISCUSSION OF THE INVENTION

The present invention aims to overcome the drawbacks of the state of the art, and to provide a headlight which, in a simple and inexpensive way, enables a single light source and a single reflector, forming one unit, to be used in order to produce two light beams having different functions, in particular the function of a dipped beam and that of a main beam.

Another object of the present invention is to provide an effective combination of a beam switching device, for changing the beam between its dipped and main beam modes, with other devices for correcting the beam, all in the same headlight.

According to the invention, a motor vehicle headlight comprising a single light source, a single reflector receiving the said light source, or lamp, the reflector being mounted on three bearing points constituting a tripod support for the reflector and disposed at the three apices of a triangle, together with controlled displacement means for selectively displacing in straight line movement at least one of the said bearing points, is characterised in that the displacement means comprise a single beam switching device for displacing one of the three bearing points into one of only two discrete positions, namely a first position corresponding to a dipped beam and a second position, raised with respect to the said first position and corresponding to a main beam.

The said beam switching device is preferably in vertical alignment with a fixed point.

According to a preferred feature of the invention, the headlight further includes, acting on a said bearing point which is aligned vertically with a fixed point, at least one device for correcting the orientation of the beam in elevation.

The said correcting device or devices preferably include, or consist of a manual device; in preferred embodiments, a said correcting device is a dynamic correcting device for correcting beam orientation as a function of variations in attitude of the vehicle.

According to another preferred feature of the invention, the said displacement, or beam switching, device is adapted to raise the beam and to offset the beam laterally away from the nearside verge of the road. This displacement or beam switching device is then preferably situated at the level of a bearing point opposed to a side of the triangle which is oblique with respect to the horizontal and with respect to the vertical.

In this last mentioned embodiment, according to a further preferred feature of the invention the headlight further includes a dynamic correcting device for correcting beam orientation as a function of variations in attitude of the vehicle, the said dynamic correcting device being arranged at the level of a said bearing point which is aligned vertically with the said bearing point opposed to the said oblique side of the triangle.

Another preferred feature of the said embodiment is that the headlight further includes at least one manual correcting device for effecting manual correction of the beam, the said manual correction device being situated at the level of a bearing point which is different from the said bearing point opposed to the oblique side of the triangle.

The inclination of the said oblique side of the triangle, with respect to the horizontal, is preferably made equal to the inclination of the direction of displacement of the beam with respect to the vertical.

In preferred embodiment of the invention, the ratio between the angle of the lateral offset of the beam away from the nearside verge, and the angle through which the beam is raised, both effected by the beam switching device, is of the order of 2:1.

According to yet another preferred feature, the headlight includes a reflector which is adapted to form by itself a wide dipped beam, and the lens of the headlight is smooth or has only a slight function of diverting light.

In some embodiments of the invention, the said controlled displacement means comprise the said beam switching device, the latter being motorised and adapted for effecting displacement of a bearing point, in that a motorised dynamic correcting device is provided for correcting beam orientation according to variations in attitude of the vehicle by acting on the same bearing point, and in that the said beam switching device and the said dynamic correcting device are driven by the same motor.

The said beam switching device may be selected from the group comprising electromagnets having two positions, blocked-torque motors, and stepping motors.

The headlight may further include means for effecting dynamic correction of the orientation of the reflector in response to variations in attitude of the vehicle, together with means for inactivating the said dynamic correcting means while a change of the beam orientation from its dipped mode to its main beam mode is being carried out.

Further aspects, features and advantages of the present invention will appear more clearly on a reading of the following detailed description of some preferred embodiments of the invention, which are given by way of non-limiting example only and with reference to the accompanying drawings.

DESCRIPTION OF PREFERRED EMBODIMENTS OF THE INVENTION

It will be noted at the outset that, as between one embodiment of the invention and the other, as described herein, those elements or parts which are identical or similar to each other are designated as far as possible by the same reference signs, and will not be described more than once.

Figure 1:
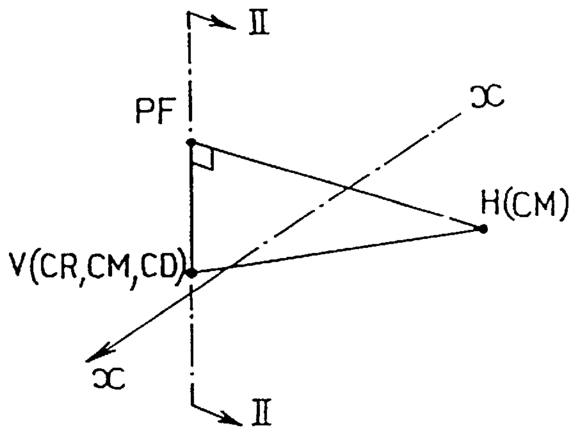
FIG. 1 is a diagram, in perspective, showing the three bearing points of the mirror and the optical axis of a headlight in a first embodiment of the invention.
Figure 2:
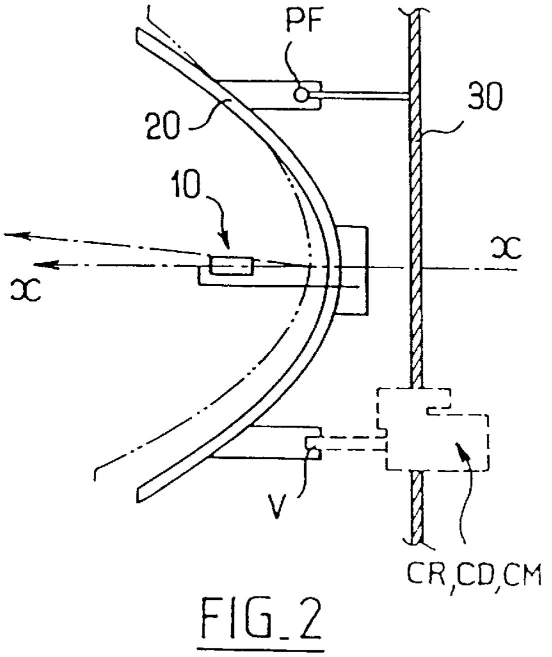
FIG. 2 is a view showing part of the headlight, in cross section taken on the line 11—11 in FIG. 1.
Figure 3:
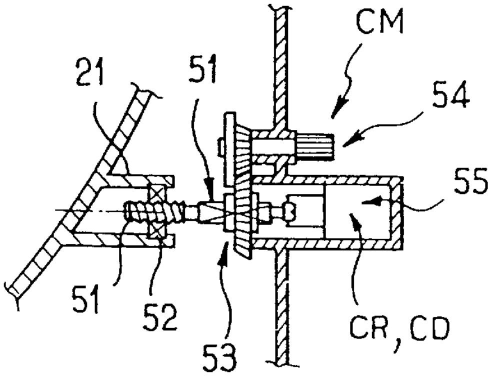
FIG. 3 is a view on an enlarged scale showing a detail of the headlight in FIG. 2.

Reference is first made to FIGS. 1 to 3, relating to a headlight in the first embodiment of the invention, which comprises a headlight casing 30 closed by a cover lens (not shown), with a reflector 20 mounted within the casing 30 and a lamp 10 mounted within the reflector. This lamp may be a filament lamp or an arc lamp for example, and defines a single light source.

The reflector is mounted conventionally on three bearing points, or support points, which are disposed at the three apices of a right angled triangle, so as to enable the orientation of the light beam produced by the headlight to be adjusted or changed, both vertically (in elevation) and horizontal (in azimuth). The term "bearing point" is to be understood here to mean a local mounting or support of a rear portion of the reflector, on a head defining a spherical surface which is connected to the casing of the headlight.

To this end, the three bearing points consist of a fixed bearing point PF, a moveable bearing point H, and another moveable bearing point V. The moveable bearing point H is at the same height as the fixed bearing point PF, and, when it is translated in a direction essentially parallel to the optical axis X—X of the reflector, it displaces the light beam in azimuth. The moveable bearing point V lies vertically below the fixed point PF, and when it is translated in a direction essentially parallel to the optical axis X—X, it displaces the beam in elevation.

The headlight further includes various means for displacing the two moveable bearing points, for the purpose of changing the orientation of the beam, namely:

a manual correcting device CM, which is known per se and which is adapted to be operated by hand, so as to give the beam generated by the reflector a reference position or zero position, with the aid of suitable optical calibrating instrumentation placed in front of the headlight while the vehicle is resting on a flat horizontal ground surface; this manual adjustment is generally an adjustment in azimuth, and where necessary in elevation;

a so-called dynamic correction device CD, which is also known per se, and which is adapted to be controlled automatically as a function of variations in the attitude of the vehicle, for example on the basis of signals provided by sensors in the region of the axles, for adjusting the height of the beam in accordance with the load carried by the vehicle and/or changes in attitude due to the state of the road;

and finally, a "dipped beam—main beam" switching device CR, which is adapted to shift the reflector from a first position, in which it generates a dipped beam which is suitably positioned in elevation, that is to say in general with the reflector being oriented with a downward inclination of 1% from the reference axis, to a second position, in which the reflector is raised so that the beam generated by the reflector, which is unchanged in absolute terms, can now be used as a main beam, with a complementary beam, if necessary, in the manner to be described in detail later herein, and vice versa.

In this embodiment, the devices CD and CR both act at the point V, while two manual correcting devices CM act at the point H and the point V respectively. The manual correcting devices thus enable a reference adjustment to be made in both elevation and azimuth.

Figure 4:
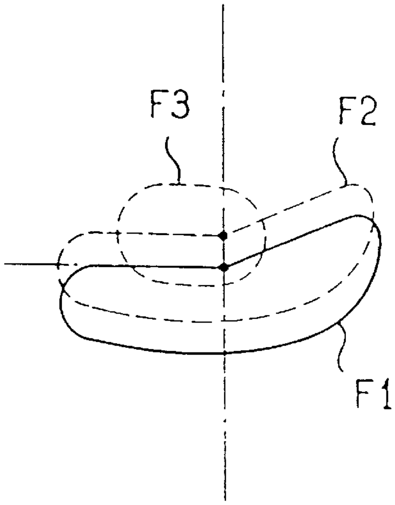
FIG. 4 shows diagrammatically the contours of two beams projected onto a projection screen and obtained from the headlight of FIGS. 1 to 3.
Figure 5:
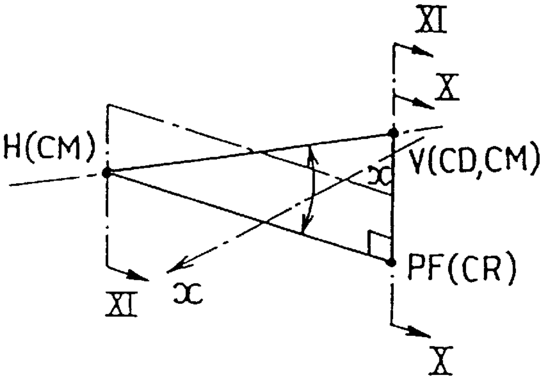
FIG. 5 is a diagram, in perspective, showing the three bearing points for the reflector, and the optical axis of a headlight in a second embodiment of the invention.
Figure 6:
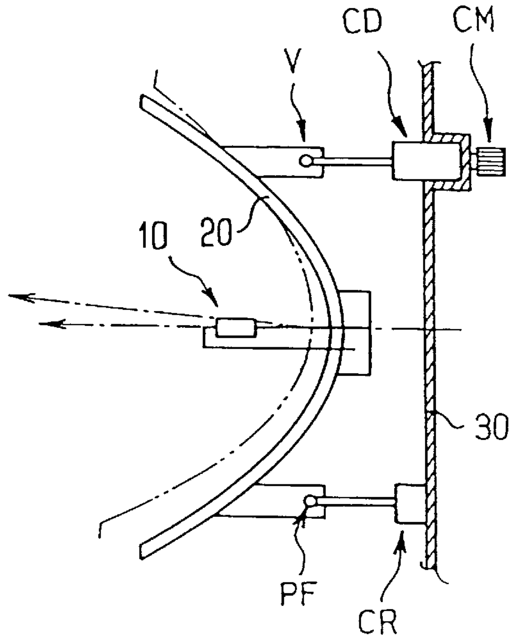
FIG. 6 is a view of part of the same headlight, in cross section taken on the line X—X in FIG. 5.
Figure 7:
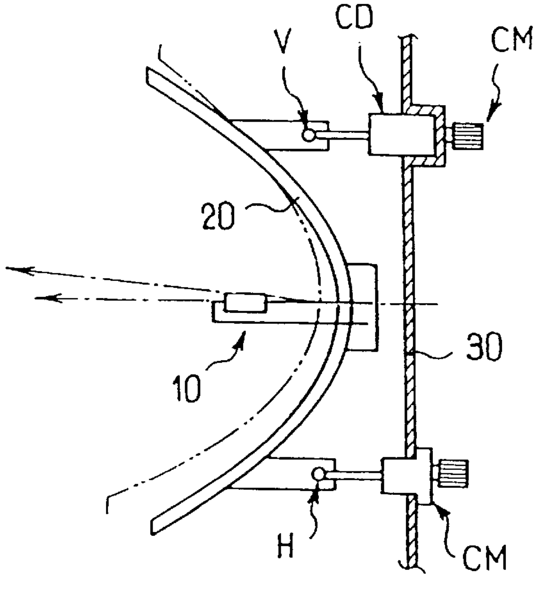
FIG. 7 is a view of part of the same headlight, in cross section taken on the line XI—XI in FIG. 5.

The device CD provides dynamic adjustment in elevation in a conventional way, while the device CR, by acting on the bearing point V, enables the dipped beam F1 or the main beam F2 shown in FIG. 4 to be produced selectively.

It will be noted here that the beam F1 is a conventional beam having so called "V" cut-off, in accordance with the relevant European regulations.

The reflector 20 is preferably so designed that it can generate this type of cut-off beam without having any recourse to an occulting mask, and the person in the art will refer to earlier patents in the name of the Applicant on this subject.

In addition, it is preferable that the reflector 20 shall be designed, as is also described in the above mentioned patents, so as to generate a beam having the required width, without any recourse to prisms or spreading striations on the cover lens. This lens is thus able to be made smooth, or with onlya very slight redirecting function.

In this way, when the beam is displaced from the "dipped" position (F1) to the "main beam" position (F2), with the lens itself remaining fixed, the perturbation effects which would have been set up if such prisms or striations had been provided, are avoided.

In this embodiment, the beam F2 is simply raised vertically with respect to the beam F1, so as thus to illuminate the road to an increased distance in front of the vehicle. If necessary, the beam F2 can be completed by a beam F3 which is narrower, and which is concentrated on the axis of the road. This additional beam can be produced by a second headlight. However, having regard to the fact that the amount of light which it has to provide is very slightly reduced as compared with a conventional main beam headlight, it can be of very much reduced dimensions in both the horizontal and vertical senses, so as not to encumber the front of the vehicle. By way of example, a complementary headlight may be used which has a height and a width of a few centimeters, up to 10 centimeters.

FIG. 3 shows diagrammatically one example of an embodiment of the combination of the devices CM, CD and CR at the bearing point V. It comprises a single multiple position linear actuator 55 for the functions of the devices CD and CR, which control the translation of a rod 51, the end of which is threaded at 51*a*. By appropriate electronic control of the linear actuator 55, the change from dipped beam to main beam and vice versa and, in the dipped mode, the function of dynamic correction according to variations in attitude, are carried out simultaneously.

The manual corrector CM situated at the point V comprises a control knob 54 driving a gear train 53 which causes the rod 51 to rotate, with the latter having in this region a cross section which may for example be square, the rod being able to slide axially with respect to the gear wheel with which it is in engagement. The threaded portion 51*a* is in engagement with a member 52 trapped in a cage 21, which is provided at the rear of the reflector 20, so giving at the same time both a universal coupling and a nut for the threaded portion 51*a*. In this way, the threaded rod 51 and the reflector can both be given a mutual reference position, with dynamic correction and changing between dipped and main beams being effected from this reference.

With reference now to FIGS. 5 to 8, these show a headlight which is different from that described in FIGS. 1 to 4, firstly in that the right-angled triangle of the bearing points is reversed, with the point V here being above the point PF, the points PF and H being changed round, and the triangle defining a right angle at the point PF. In this example, the dipped beam—main beam switching device CR is at the bearing point PF. A first manual correcting device CM is arranged at the bearing point H, while a second manual correcting device CM, and the dynamic correcting device CD, are both arranged at the bearing point V.

It will be understood here that the point which is here called the "fixed point" PF is not fixed in the strict sense in this embodiment, because it is displaced during the operation of switching between the dipped beam and main beam modes. It will however continue to be referred to by this term, because in practice it takes the place of a fixed point during the manual and dynamic corrections into one or other of the two positions.

The two manual correcting devices enable the beam to be adjusted (as to its reference orientation) both in elevation by acting at the point V, and in azimuth by acting at the point H. The dynamic correcting device acts conventionally at the point V.

The device for switching between the dipped and main beam positions has the feature that it acts at a single point, namely the fixed point PF, so as to rotate the reflector about an axis passing through the diagonal of the right-angled triangle which joins the moveable bearing points H and V. Accordingly, the dipped beam F1 is displaced simultaneously upwardly and sideways so as to constitute the main beam F2.

The angle through which the beam is raised is so chosen as to illuminate the road over a long range with a sufficient intensity, and for this purpose it typically has an elevation of 1.5%, while the lateral or sideways angle of offset is so chosen to centre the concentration nucleus of the dipped beam F1 in the axis of the road.

It is necessary to know, in this connection, that a conventional dipped beam has a nucleus of light concentration which is offset downwardly towards the side of the road, i.e. the nearside verge when the vehicle is facing forwards on the road, so as to direct most of the light downwardly on that side. The purpose of the offset is to return this concentration nucleus into the axis of the road, i.e. the line of travel of the vehicle. The value of this angle of displacement, which is therefore a displacement to the left for a vehicle driving on the right hand side of the road, is for example 3%.

Figure 8:
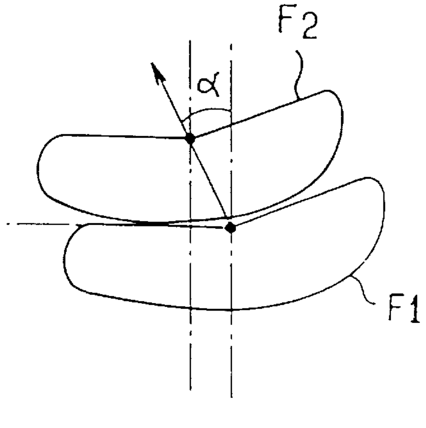
FIG. 8 shows diagrammatically the contours of two beams projected onto a projection screen and obtained from the headlight in FIGS. 5 to 7.

More precisely, if the angle of the hypotenuse HV with respect to the horizontal is called , then the angle of the displacement of the beam in the plane of projection will have the same value , but with respect to the vertical, as can be seen in FIG. 8. Thus, the positions of the three points PF, H and V behind the reflector are so chosen as to give the desired obliquity of displacement. With this embodiment, switching between the dipped beam and main beam positions can be carried out with a single switching device CR.

Some additional explanations will now be given, which are valid for all embodiments of the invention in which a dynamic correcting device CD, and a beam switching device CR for switching between the dipped and main beam modes, both act on the same bearing point.

The course of travel of the dynamic corrector is typically 8 mm. The course of travel of the switching device CR will for example be 4 mm.

During the operation of switching from the dipped beam mode to the main beam mode, which is carried out conventionally by the driver of the vehicle, an electronic computer is arranged to perform the following functions:

carrying out obligatory disconnection of the dynamic correction data provided by the attitude sensors of the vehicle, so that the computer then delivers to the switching device CD static information only, so as to fix it in the position in which it happens to be at the time; in this connection, dynamic attitude correction is not obligatory in the main beam mode;

making an obligatory transmission of information to the switching device CR so as to displace of the latter through 4 mm, so as to shift the dipped beam (for example F1) to a main beam (for example F2);

switching on the lamp of the additional main beam light, if such a light is provided, for giving the additional beam F3 in FIG. 4 for example;

finally, in the case where the headlight is completed by an occulting device for the dipped beam, such device, in particular, constituting a mask for direct light, or an occulting cup member of the same type as the anterior filament of a normal H4 headlight lamp, in cooperation with a parabolic reflector, this occulting device is withdrawn so as to increase the light flux.

Naturally, these operations are all carried out at the same time, and the reverse operation as performed when the main beam is to be converted once again into a dipped beam.

It will be observed that the combination of the first two operations described above enables the provision of a separate plate member for mounting the dynamic correction device CD and the switching device CR to be avoided, because both of these devices can be mounted directly on the casing of the headlight and use the same electric motor.

By contrast, where a manual correcting device CM and a dynamic correcting device CD are arranged to act on the same bearing point, it is necessary to fix the manual correcting device CM on the casing of the headlight, and to fix the dynamic correction device CD on a moveable carrier member which is arranged to be displaced by the manual correcting device CM.

In practical terms, the devices for switching the beam between its dipped and main beam modes, the function of which is that of linear actuators having two discrete positions, may be provided by electromagnets having two positions, or by motors of the blocked-torque type, or again by stepping motors.

Finally, it will be observed that the principle whereby the dipped beam is displaced so as to constitute a main beam, in accordance with the present invention, may also be applied in headlights in which the reflector is mounted on the casing of the headlight by means other than by tripod support on three bearing points.

What is claimed is:

1. A multi-functional headlight for a motor vehicle adapted for selectively projecting a main beam and a dipped beam when the vehicle is in motion, comprising:

a casing;

means in the casing defining first, second and third bearing points which constitute the three apices of a triangle;

a single reflector tripod mounted on said bearing points;

a single light source carried by the reflector, the single light source producing a light beam emitted from the headlight;

a controlled displacement device for selectively displacing said first bearing point in straight line movement and thereby adjusting the elevation of the light beam emitted from the headlight, wherein the controlled displacement device comprises a single beam switching device adapted to displace said first bearing point between two discrete. predetermined positions when the vehicle is in motion, namely a first predetermined position corresponding to the dipped beam and a second predetermined position corresponding to the main beam, the second predetermined position being raised with respect to the first predetermined position;

a correcting device for correcting beam orientation in elevation for displacing said first bearing point; and wherein said controlled displacement device and said correcting device are located substantially in proximity to said first bearing point.

2. A multi-functional headlight according to claim 1, wherein said second bearing point is a fixed point with respect to the casing, and the beam switching device is aligned vertically with the fixed second bearing point.

3. A multi-functional headlight according to claim 1, wherein said second bearing point is fixed with respect to the casing, and wherein the headlight further includes a manually operable correcting device located at said first predetermined position which is vertically aligned with said second bearing point.

4. A multi-functional headlight according to claim 1, wherein the correcting device is a dynamic correcting device responsive to variations in attitude of the vehicle.

5. A multi-functional headlight according to claim 1, wherein the beam switching device is adapted to raise the beam and to offset if laterally away from the nearside verge of a road when the vehicle is disposed facing forwards along the road.

6. A multi-functional headlight according to claim 5, wherein the ratio between the angle of lateral offset of the light beam in its dipped mode and the angle through which it is raised when changing from the dipped mode to the main beam mode is of the order of 2:1.

7. A multi-function headlight according to claim 5, wherein said first and third bearing points define a side of the triangle which is oblique with respect to both the horizontal and the vertical, the beam switching device being disposed at the level of said first bearing point.

8. A multi-functional headlight according to claim 7, further including at least one manually operable beam correcting device at the level of said third bearing point.

9. A multi-functional headlight according to claim 7, wherein the oblique side of the triangle defines an angle of inclination with respect to the horizontal, the angle of inclination being equal to the angle of inclination of the direction in which the light beam is displaced with respect to the vertical.

10. A multi-functional headlight according to claim 1, further including a cover lens which is smooth or adapted to slightly deviate the beam, the reflector being adapted to form by itself a wide dipped beam.

11. A headlight according to claim 1, wherein the said controlled displacement means further include a motor coupled to the said beam switching device for operating the latter for displacement of a said bearing point, and a dynamic correction device coupled to the same motor for operation by the motor, whereby to correct the position of the same bearing point in response to variations in altitude of the vehicle.

12. A multi-functional headlight according to claim 1, wherein the beam switching device includes actuating means selected from the group consisting of two-position electromagnets, blocked-torque motors, and stepping motors.

13. A multi-functional headlight according to claim 1, further including means connected to the correcting device for inactivating the correcting device while a change is being effected to the orientation of the light beam from its dipped mode to its main beam mode.

14. A multi-functional headlight according to claim 1, wherein the correcting device is a dynamic correcting device.

15. A multi-functional headlight for a motor vehicle adapted for selectively projecting a main beam and a dipped beam when the vehicle is in motion, comprising:

a casing;

means in the casing defining first, second and third bearing points which constitute the three apices of a triangle;

a single reflector tripod mounted on said bearing points;

a single light source carried by the reflector, the single light source producing a light beam emitted from the headlight;

a controlled displacement device for selectively displacing said first bearing point in straight line movement and thereby adjusting the elevation of the light beam emitted from the headlight, wherein the controlled displacement device comprises a single beam switching device adapted to displace said first bearing point between two discrete, predetermined positions when the vehicle is in motion, namely a first predetermined position corresponding to the dipped beam and a second predetermined position corresponding to the main beam, the second predetermined position being raised with respect to the first predetermined position;

a correcting device for correcting beam orientation in elevation for displacing said first bearing point;

a manually operable device for correcting beam orientation in elevation for displacing said first bearing point; and wherein said controlled displacement device, said correcting device and said manually operable device are located substantially in proximity to said first bearing point.

16. A multi-functional headlight according to claim 15, wherein the correcting device is a dynamic correcting device.

17. A multi-functional headlight according to claim 16, wherein the controlled displacement device, dynamic correcting device and manually operable device are located substantially in proximity to said first bearing point.

18. A multi-functional headlight for a motor vehicle adapted for selectively projecting a main beam and a dipped beam when the vehicle is in motion, comprising:

a casing;

means in the casing defining first, second and third bearing points which constitute the three apices of a triangle;

a single reflector tripod mounted on said bearing points;

a single light source carried by the reflector, the single light source producing a light beam emitted from the headlight;

a controlled displacement device for selectively displacing said first bearing point in straight line movement and thereby adjusting the elevation of the light beam emitted from the headlight, wherein the controlled displacement device comprises a single beam switching device adapted to displace said first bearing point between two discrete, predetermined positions when the vehicle is in motion, namely a first predetermined position corresponding to the dipped beam and a second predetermined position corresponding to the main beam, the second predetermined position being raised with respect to the first predetermined position;

a correcting device for correcting beam orientation in elevation for displacing said first bearing point;

device connected to the correcting device for inactivating the dynamic correcting device while a change is being effected to the orientation of the light beam from its dipped mode to its main beam mode;

a manually operable device for correcting beam orientation in elevation for displacing said first bearing point; and wherein said controlled displacement device, said correcting device and said manually operable device are located substantially in proximity to said first bearing point.

19. A multi-functional headlight according to claim 18, wherein the correcting device is a dynamic correcting device.

* * * * *